US008955127B1

(12) United States Patent
Sokolov et al.

(10) Patent No.: US 8,955,127 B1
(45) Date of Patent: Feb. 10, 2015

(54) SYSTEMS AND METHODS FOR DETECTING ILLEGITIMATE MESSAGES ON SOCIAL NETWORKING PLATFORMS

(75) Inventors: Ilya Sokolov, Boston, MA (US); Keith Newstadt, West Newton, MA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/557,077

(22) Filed: Jul. 24, 2012

(51) Int. Cl.
*G06F 17/27* (2006.01)
*G06F 17/30* (2006.01)
*H04L 12/58* (2006.01)

(52) U.S. Cl.
USPC .................... 726/23; 726/22; 726/24; 726/26

(58) Field of Classification Search
CPC ... G06F 17/27; G06F 17/30; G06F 17/30699; G06F 17/30867; G06F 17/30864; H04L 12/58; H04L 12/581; H04L 12/585; H04L 12/588; H04L 41/22; H04L 51/22; H04L 51/32; H04L 63/1441; H04L 63/1483; H04L 67/02; H04L 67/20; H04L 67/306; G06Q 10/00; G06Q 10/107; G06Q 50/01
USPC ............................................... 726/22–24, 26
See application file for complete search history.

(56) References Cited

U.S. PATENT DOCUMENTS

| | | | | |
|---|---|---|---|---|
| 8,150,779 B1* | 4/2012 | Gauvin | ............ | 705/319 |
| 8,244,532 B1* | 8/2012 | Begeja et al. | ............ | 704/250 |
| 2005/0198160 A1* | 9/2005 | Shannon et al. | ............ | 709/206 |
| 2006/0168032 A1* | 7/2006 | Cai et al. | ............ | 709/206 |
| 2009/0158430 A1* | 6/2009 | Borders | ............ | 726/23 |
| 2009/0228486 A1* | 9/2009 | Kuehr-McLaren et al. | ...... | 707/9 |
| 2009/0249451 A1* | 10/2009 | Su et al. | ............ | 726/5 |
| 2010/0114911 A1* | 5/2010 | Al-Kofahi et al. | ............ | 707/748 |
| 2010/0180333 A1* | 7/2010 | Bono et al. | ............ | 726/13 |
| 2011/0256889 A1* | 10/2011 | Polis et al. | ............ | 455/456.3 |
| 2012/0215861 A1* | 8/2012 | Smith et al. | ............ | 709/206 |
| 2013/0073568 A1* | 3/2013 | Federov et al. | ............ | 707/749 |

OTHER PUBLICATIONS

Sourabh Satish; Systems and Methods for Validating Electronic Message Recipients; U.S. Appl. No. 13/452,734, filed Apr. 20, 2012.
Ilya Soklov; Systems and Methods for Performing Security Analyses of Applications Configured for Cloud-Based Platforms; U.S. Appl. No. 13/439,458, filed Apr. 4, 2012.
Caroline Ghiossi; Explaining Facebook's Spam Prevention Systems;—http://blog.facebook.com/blog.php?post=403200567130&fb_comment_id=fbc_403200567130_18440560_10150256618857131#uvivw0_1, as accessed on Apr. 24, 2012.

* cited by examiner

*Primary Examiner* — Joseph P Hirl
*Assistant Examiner* — Kalish Bell
(74) *Attorney, Agent, or Firm* — ALG Intellectual Property, LLC

(57) ABSTRACT

A computer-implemented method for detecting illegitimate messages on social networking platforms may include 1) identifying a message sent via a social networking platform, 2) harvesting metadata from the social networking platform that describes a sender of the message, 3) determining, based at least in part on the metadata that describes the sender of the message, that the message is illegitimate, and 4) performing a remediation action on the message in response to determining that the message is illegitimate. Various other methods, systems, and computer-readable media are also disclosed.

20 Claims, 6 Drawing Sheets

SYSTEMS AND METHODS FOR DETECTING ILLEGITIMATE MESSAGES ON SOCIAL NETWORKING PLATFORMS

BACKGROUND

Internet users increasingly rely on cloud-based services for social networking, shopping, gaming, and other activities. Some cloud-based services have achieved user bases of hundreds of millions of users and have extended their platforms to attract more users and/or keep existing users within the services' online ecosystems. For example, some cloud-based services have provided messaging mechanisms for users to privately and/or publicly exchange and/or share messages via these cloud-based services.

In order to encourage user participation, cloud-based services may maintain relatively low standards for user registration and submissions. Unfortunately, the large user bases available under these uniform platforms may attract those who wish to exploit large numbers of people, potentially bringing scams, phishing attempts, spam attacks, and/or unwanted content to users. Traditional classification systems for identifying and remediating illegitimate content may fail to correctly classify all content, resulting in undesired false positives and/or false negatives. Furthermore, traditional classification systems developed to combat email spam may rely on traditional email feature information, such as the mail servers of origin, email headers, user agents, etc. Accordingly, the instant disclosure identifies and addresses a need for additional and improved systems and methods for detecting illegitimate messages on social networking platforms.

SUMMARY

As will be described in greater detail below, the instant disclosure generally relates to systems and methods for detecting illegitimate messages on social networking platforms by harvesting social networking data from the social networking platforms relating to senders of messages to determine whether messages are illegitimate. In one example, a computer-implemented method for detecting illegitimate messages on social networking platforms may include 1) identifying a message sent via a social networking platform, 2) harvesting metadata from the social networking platform that describes a sender of the message, 3) determining, based at least in part on the metadata that describes the sender of the message, that the message is illegitimate, and 4) performing a remediation action on the message in response to determining that the message is illegitimate.

In some examples, harvesting the metadata from the social networking platform may include harvesting metadata from the social networking platform describing a relationship between the sender of the message and a recipient of the message. As will be explained in greater detail below, the relationship may include any of a variety of connections and/or associations between the sender and the recipient extracted from the metadata.

In some embodiments, harvesting the metadata may include 1) identifying a set of relationships between users of the social networking platform and 2) identifying a lack of a connection between the sender of the message and a recipient of the message via the set of relationships. In these embodiments, determining that the message is illegitimate may include determining that the lack of the connection indicates that the message is illegitimate.

In one example, harvesting the metadata may include identifying an amount of past communication between the sender of the message and a recipient of the message via the social networking platform. In this example, determining that the message is illegitimate may include determining that the amount of past communication falls below a predetermined threshold.

In one embodiment, harvesting the metadata may include identifying a locality of the sender of the message defined within a profile of the sender of the message within the social networking platform and a locality of the recipient of the message defined within a profile of the recipient of the message within the social networking platform. In this embodiment, determining that the message is illegitimate may include determining that the locality of the sender of the message does not match the locality of the recipient of the message.

In some examples, harvesting the metadata may include analyzing at least one past message sent from the sender of the message to the recipient of the message via the social networking platform to identify a topic of the past message. In these examples, determining that the message is illegitimate may include determining that a topic of the message does not match the topic of the past message.

In some embodiments, harvesting the metadata may include analyzing at least one past message sent from the sender of the message via the social networking platform to identify a writing style of the past message. In these embodiments, determining that the message is illegitimate may include determining that the writing style of the message does not match the writing style of the past message.

In some examples, determining that the message is illegitimate may further include 1) identifying a spam signature within the message, 2) identifying a call to action within the message, 3) identifying a malicious link within the message, and/or 4) determining that at least a portion of the message is repeated in a plurality of additional messages sent via the social networking platform.

In some embodiments, performing the remediation action may include 1) blocking the message and/or 2) adding the message to a spam database.

In one embodiment, a system for implementing the above-described method may include 1) an identification module programmed to identify a message sent via a social networking platform, 2) a harvesting module programmed to harvest metadata from the social networking platform that describes a sender of the message, 3) a determination module programmed to determine, based at least in part on the metadata that describes the sender of the message, that the message is illegitimate, and 4) a remediation module programmed to perform a remediation action on the message in response to determining that the message is illegitimate. In some examples, the system may also include at least one processor configured to execute the identification module, the harvesting module, the determination module, and the remediation module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify a message sent via a social networking platform, 2) harvest metadata from the social networking platform that describes a sender of the message, 3) determine, based at least in part on the metadata that describes the sender of the message, that the message is illegitimate, and 4) perform a remediation action on the message in response to determining that the message is illegitimate.

As will be explained in greater detail below, by harvesting social networking data from the social networking platforms relating to senders of messages to determine whether messages are illegitimate, the systems and methods described herein may leverage information about message senders that is stored, generated, maintained, and/or processed by social networking platforms (e.g., information that may otherwise be unavailable to traditional message classification systems) to evaluate the legitimacy of their messages, thereby potentially improving the accuracy of message classification techniques.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
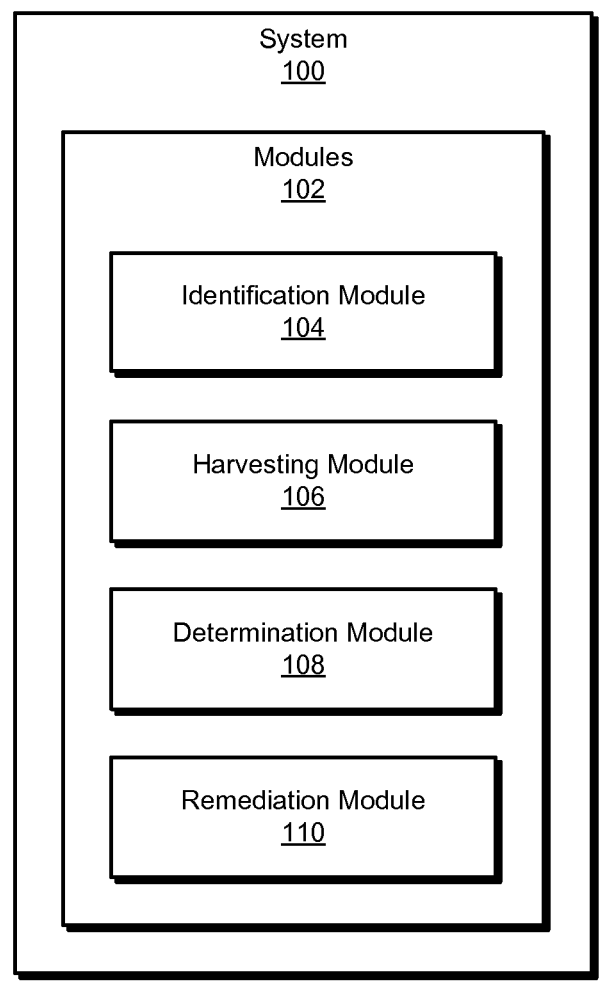
FIG. 1 is a block diagram of an exemplary system for detecting illegitimate messages on social networking platforms.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
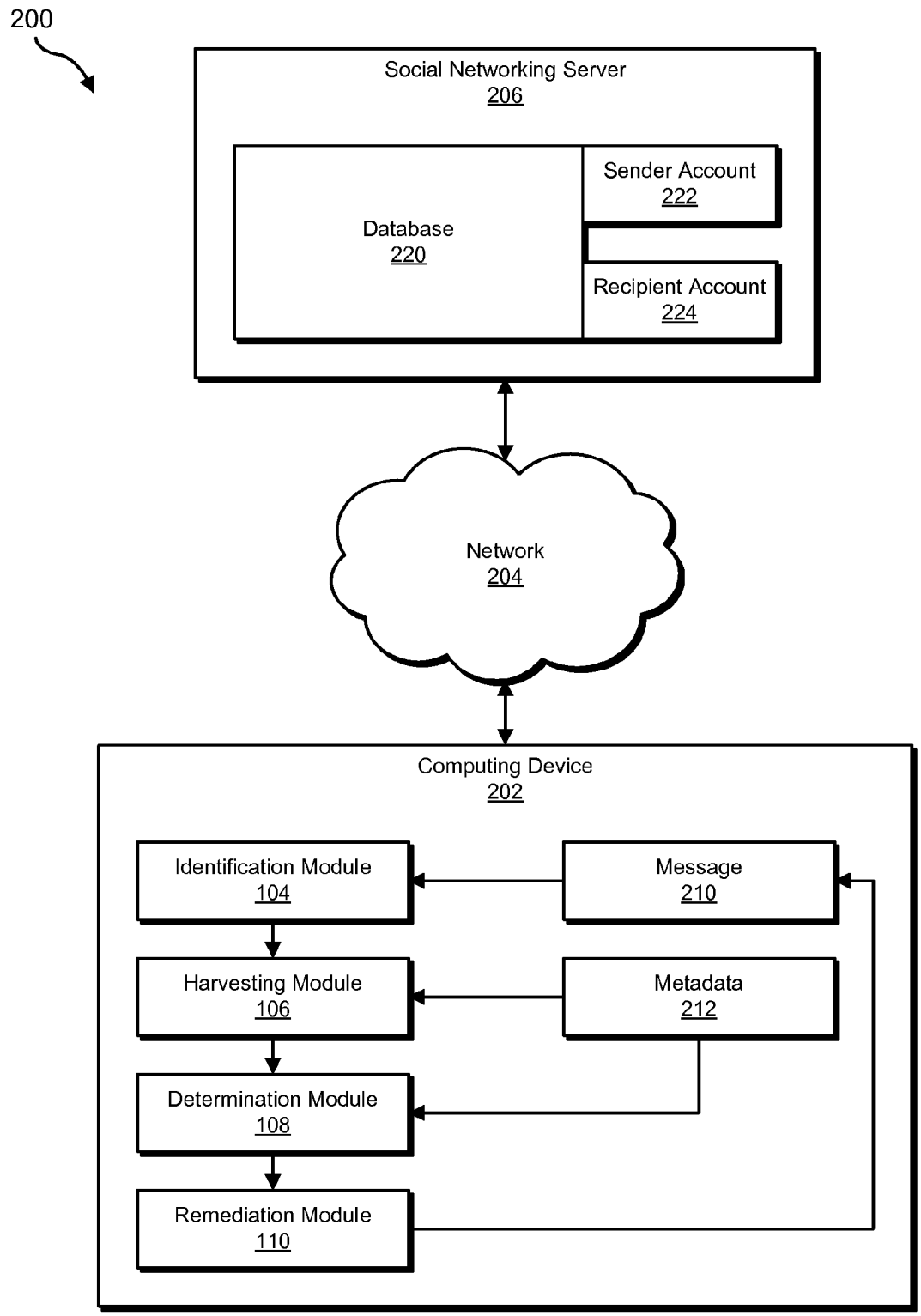
FIG. 2 is a block diagram of an exemplary system for detecting illegitimate messages on social networking platforms.
Figure 3:
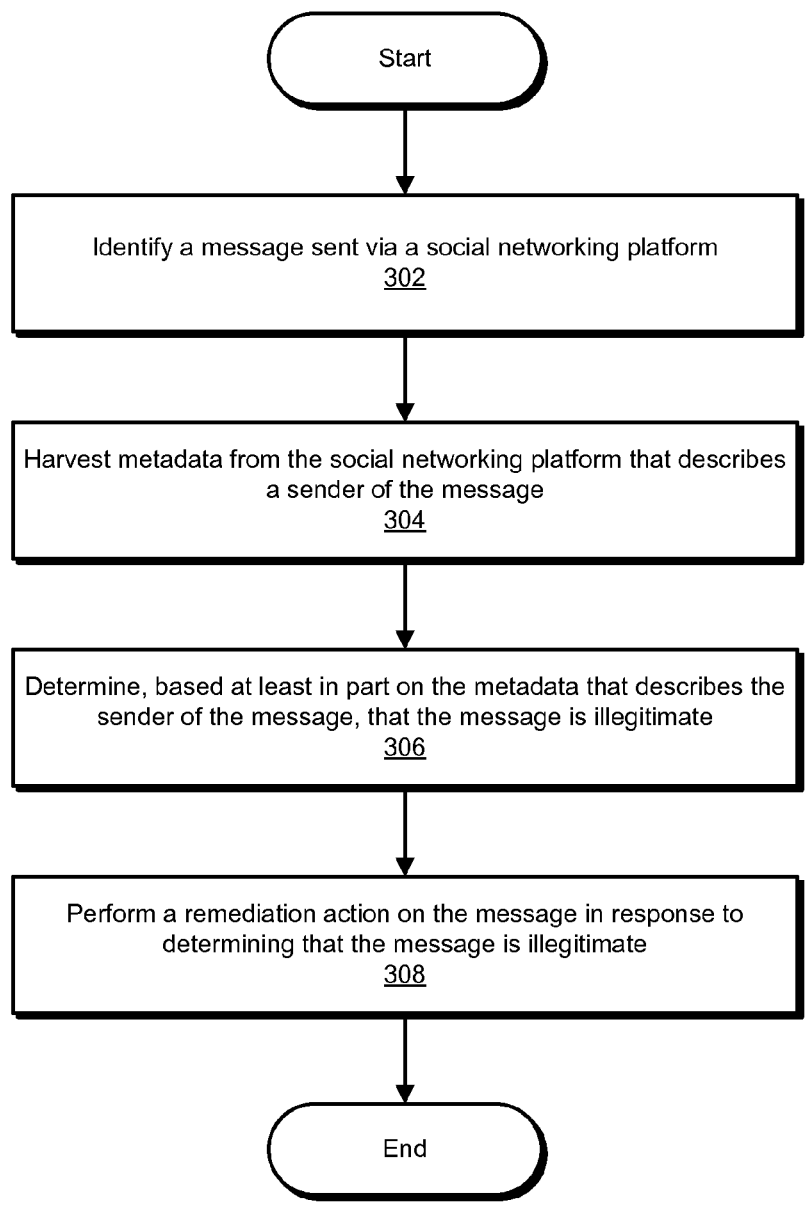
FIG. 3 is a flow diagram of an exemplary method for detecting illegitimate messages on social networking platforms.
Figure 4:
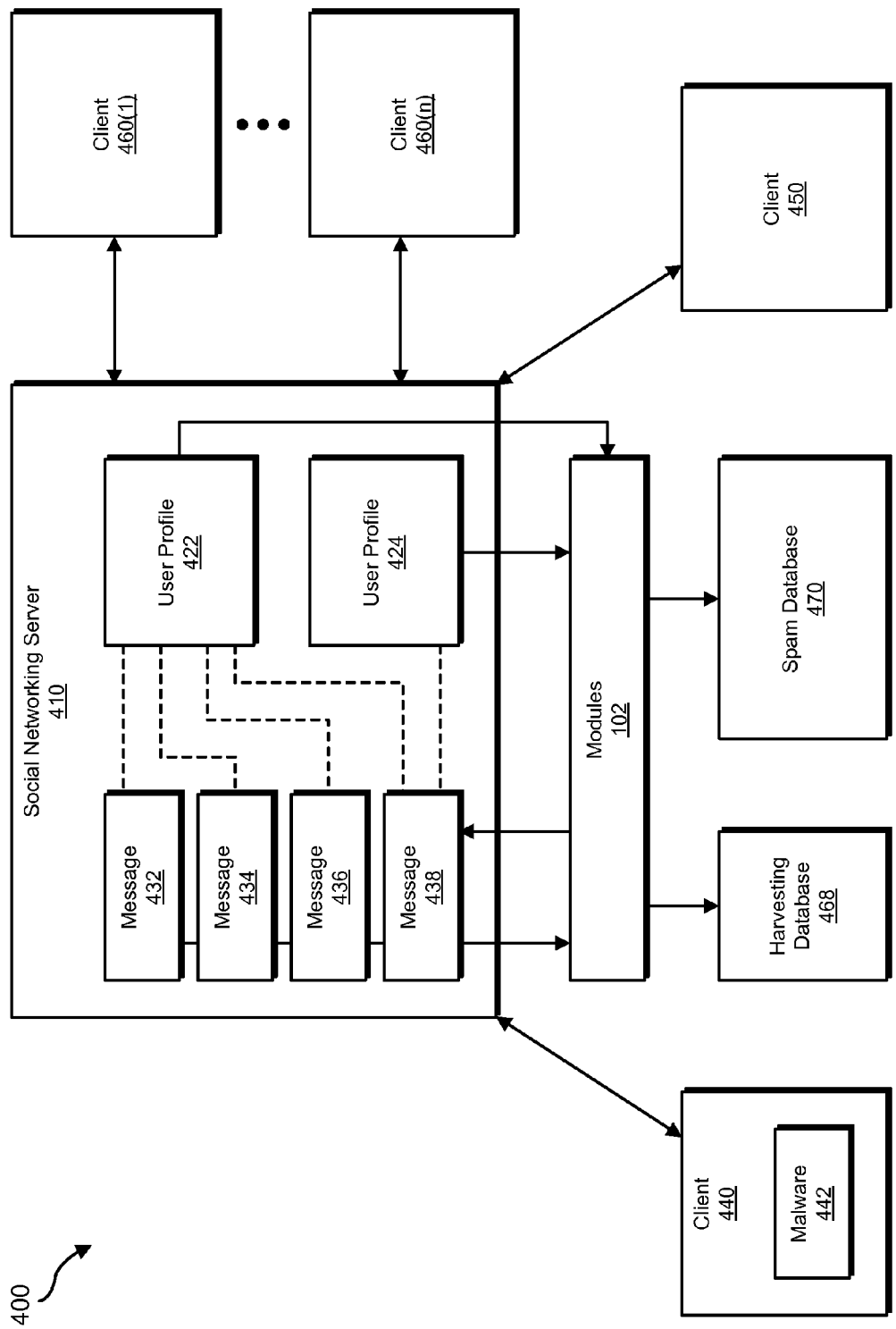
FIG. 4 is a block diagram of an exemplary system for detecting illegitimate messages on social networking platforms.

The following will provide, with reference to FIGS. 1, 2, and 4, detailed descriptions of exemplary systems for detecting illegitimate messages on social networking platforms. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for detecting illegitimate messages on social networking platforms. As illustrated in this figure, exemplary system 100 may include one or more modules 102 for performing one or more tasks. For example, and as will be explained in greater detail below, exemplary system 100 may include an identification module 104 programmed to identify a message sent via a social networking platform. Exemplary system 100 may also include a harvesting module 106 programmed to harvest metadata from the social networking platform that describes a sender of the message.

In addition, and as will be described in greater detail below, exemplary system 100 may include a determination module 108 programmed to determine, based at least in part on the metadata that describes the sender of the message, that the message is illegitimate. Exemplary system 100 may also include a remediation module 110 programmed to perform a remediation action on the message in response to determining that the message is illegitimate. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or social networking server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a social networking server 206 via a network 204. For example, computing device 202 may include a security server configured to detect social networking spam. Additionally or alternatively, computing device 202 may include a client system that accesses a social networking service. In some examples, computing device 202 may include a computing device configured to execute one or more applications within a social networking platform.

In one embodiment, one or more of modules 102 from FIG. 1 may, when executed by at least one processor of computing device 202, facilitate computing device 202 in detecting illegitimate messages on social networking platforms. For example, and as will be described in greater detail below, one or more of modules 102 may cause computing device 202 to 1) identify a message 210 sent via a social networking platform (e.g., including social networking server 206), 2) harvest metadata 212 from social networking server 206 that describes a sender account 222 used to send message 210 (e.g., to be received and/or viewed via a recipient account 224), 3) determine, based at least in part on metadata 212 that describes sender account 222 used to send message 210, that message 210 is illegitimate, and 4) perform a remediation action on message 210 in response to determining that message 210 is illegitimate.

Computing device 202 generally represents any type or form of computing device capable of reading computer-executable instructions. Examples of computing device 202 include, without limitation, desktops, servers, laptops, tablets, cellular phones, personal digital assistants (PDAs), multimedia players, embedded systems, combinations of one or more of the same, exemplary computing system 510 in FIG. 5, or any other suitable computing device.

Social networking server 206 generally represents any type or form of computing device that is capable of performing one or more social networking functions and/or storing, generating, and/or relaying social networking data. Examples of social networking server 206 include, without limitation, application servers and database servers configured to provide various database services and/or run certain software applications.

Database 220 may represent portions of a single database or computing device or a plurality of databases or computing devices. For example, database 220 may represent a portion of social networking server 206 in FIG. 2, computing system 510 in FIG. 5, and/or portions of exemplary network architecture 600 in FIG. 6. Alternatively, database 220 in FIG. 1 may represent one or more physically separate devices capable of being accessed by a computing device, such as social networking server 206 in FIG. 2, computing system 510 in FIG. 5, and/or portions of exemplary network architecture 600 in FIG. 6.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and social networking server 206.

FIG. 3 is a flow diagram of an exemplary computer-implemented method 300 for detecting illegitimate messages on social networking platforms. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a message sent via a social networking platform. For example, at step 302 identification module 104 may, as part of computing device 202 in FIG. 2, identify message 210 sent via a social networking platform (e.g., including social networking server 206).

As used herein, the phrase "social networking platform" may refer to any computing device and/or devices, software framework, and/or combination thereof usable for providing and/or hosting a service (e.g., via the Internet). In some examples, the phrase "social networking platform" may refer to a platform that provides a social networking service. As used herein, the phrase "social networking service" may refer to any service and/or Internet site that manages social connections and/or shares, compiles, formats, and/or broadcasts information based on social connections. Examples of social networking platforms may include FACEBOOK, TWITTER, GOOGLE+, LINKEDIN, and FLICKR. In some examples, the online service may host data and/or process the data via cloud-based applications (e.g., web-based email clients, online calendar applications, online picture albums, etc.) for personal and/or private use. Additionally or alternatively, the phrase "social networking service" as used herein may refer to any of a variety of online services that enable users to submit, post, and/or transmit messages and that maintain information about users. For example, the phrase "social networking service" as used herein may refer to online shopping services (e.g., EBAY), online gaming services (e.g., HI5), online entertainment services (e.g., YOUTUBE), etc.

As used herein, the term "message" may refer to any of a variety of text-inclusive forms of communication via social networking platforms. Examples of messages may include private messages sent from one user of a social networking service to another user of the social networking service and to be accessed within the social networking service, private messages sent from one user of a social networking service to an email account of another user of the social networking service, private instant messages sent from one user of a social networking service to another user of the social networking service, posts made to a profile, wall, and/or account of a social networking service, comments relating to content submitted to a social networking service, etc. As used herein, the term "illegitimate message" may refer to any message that is undesired by a social networking service, a security service, and/or a potential recipient of the message. Examples of illegitimate messages may include spam messages, messages with scams (e.g., phishing attempts), messages that potential violate terms of service, messages that include and/or facilitate malware, etc. The message may originate in any of a variety of contexts. For example, the message may originate from malware operating on a client device (e.g., belonging to the sender) that is connected to the social networking service. Additionally or alternatively, the message may originate from a social networking application with access to an account of the sender on the social networking service (e.g., the sender may have installed and/or allowed access for a malicious social networking application).

Identification module 104 may identify the message in any of a variety of contexts. For example, identification module 104 may identify the message by operating as a part of the social networking platform (e.g., an application, such as an anti-spam application, integrated with the social networking platform), by operating as a part of a client accessing the social networking platform (e.g., a web browser toolbar and/or plugin), and/or by operating as a part of a stand-alone service that has received an identification of the message from the social networking platform and/or a client accessing the social networking platform.

FIG. 4 illustrates an exemplary system 400 for detecting illegitimate messages on social networking platforms. As shown in FIG. 4, exemplary system 400 may include a social networking server 410, a client 440, a client 450, and clients 460(1)-(n). Using FIG. 4 as an example, client 440 may be infected with malware 442 that is configured to use client 440 to submit illegitimate messages to a social networking server 410 (e.g., by using an active social networking session of a user of client 440). Social networking server 410 may include past messages 432, 434, 436, and a newly-submitted message 438 from client 440 (e.g., by malware 442) using an account corresponding to a user profile 422 to an account corresponding to a user profile 424.

Returning to FIG. 3, at step 304 one or more of the systems described herein may harvest metadata from the social networking platform that describes a sender of the message. For example, at step 304 harvesting module 106 may, as part of computing device 202 in FIG. 2, harvest metadata 212 from social networking server 206 that describes sender account 222 used to send message 210.

As used herein, the term "metadata" may refer to any selection of data from a larger group of data and/or any data describing one or more characteristics of the larger group of data. Accordingly, the metadata may describe the sender of the message according to any of a variety of characteristics. Harvesting module 106 may harvest the metadata in any of a variety of ways. For example, harvesting module 106 may operate as a part of the social networking platform and directly access one or more databases of the social networking platform. Additionally or alternatively, harvesting module 106 may operate as a part of a third-party system and crawl public profiles, messages, and other publicly-available data from the social networking platform to harvest the metadata. In some examples, harvesting module 106 may access an API of the social networking platform to harvest the metadata from the social networking platform. As used herein, the term "sender" as applies to a message may refer to any account associated with the social networking platform that submitted the message to the social networking platform. In some examples, harvesting module 106 may save at least a portion of the metadata in a database for harvested metadata.

As mentioned above, harvesting module 106 may harvest any of a variety of types of metadata describing the sender. In some examples, harvesting module 106 may harvest metadata from the social networking platform describing a relationship between the sender of the message and a recipient of the message. As used herein, the term "relationship" may refer to any relationship, connection, and/or correlation between two or more user accounts of a social networking platform. As used herein, the term "recipient" may refer to any account designated to receive, view, and/or have access to the message (e.g., as specified by the message and/or the sender of the message). In some examples, the recipient may not have received the message (e.g., because one or more of the systems described herein may hold the message until determining whether the message is legitimate). In some examples, the recipient may not be the sole recipient of the message—for example, the message may be addressed to multiple recipients and/or may be submitted to a portion of the social networking service with multiple prospective viewers.

In some examples, harvesting module 106 may identify a set of relationships between users of the social networking platform. For example, harvesting module 106 may identify the contacts, friends, followers, and/or fans of the users to identify how the users relate to each other. As will be explained in greater detail below, harvesting module 106 may identify how any two users relate to each other (e.g., whether the sender and a recipient of the message are directly connected within the social networking platform, are indirectly connected (e.g., sharing mutual contacts and/or friends), etc.). In some examples, harvesting module 106 may identify a lack of a connection between the sender of the message and the recipient of the message via the set of relationships. For example, harvesting module 106 may determine that the sender and the recipient are not mutual contacts within the social networking platform, are not friends within the social networking platform, and/or are too distantly connected and/or remotely related within the social networking platform (e.g., removed by three or more degrees of friendship).

In some examples, harvesting module 106 may identify an amount of past communication between the sender of the message and a recipient of the message via the social networking platform. For example, harvesting module 106 may determine whether the sender has ever sent a message directly to the recipient. Additionally or alternatively, harvesting module 106 may determine if the recipient has ever accessed (e.g., opened and/or viewed) a message sent by the sender. In some examples, harvesting module 106 may determine if the recipient has ever replied to a message from the sender and/or initiated a message to the sender. In some examples, harvesting module 106 may determine how frequently and/or how recently the sender and the recipient have communicated via the social networking platform.

In some examples, harvesting module 106 may identify a locality of the sender of the message defined within a profile of the sender of the message within the social networking platform and a locality of the recipient of the message defined within a profile of the recipient of the message within the social networking platform. As used herein, the term "profile" may refer to any information within a social networking platform describing a user of the social networking platform. For example, a profile may include biographical data about a user that was submitted by the user and/or a contact of the user and/or that was imported to the social networking platform from another service. As used herein, the term "locality" may refer to any geographical location and/or institution that may be shared by two or more users. Examples of localities include, without limitation, home street addresses, workplaces, educational institutions, check-in locations, reviewed businesses, cities, countries, and the like. Generally, the term "locality" may refer to any social nexus outside of the social networking platform (e.g., a place, group, and/or institution whereby two users of the social networking platform may know each other independently of the social networking platform).

In some examples, harvesting module 106 may analyze at least one past message sent from the sender of the message to the recipient of the message via the social networking platform to identify a topic of the past message. As used herein, the term "topic" may refer to any semantic feature of an electronic message. For example, the term "topic" may refer to any latent semantic element (e.g., a concept, subject matter, etc.) represented within and/or used to generate a message. Additionally or alternatively, the term "topic" may refer to an explicit semantic categorization of the past message.

Harvesting module 106 may identify the topic in any of a variety of ways. For example, harvesting module 106 may analyze content of the past message to extract the topic. For example, harvesting module 106 may perform a semantic analysis on the content of the past message to extract the topic. As used herein, the phrase "semantic analysis" may refer to any technique for identifying topics within, extracting topics from, and/or attributing topics to a corpus of messages. For example, the semantic analysis may include a latent Dirichlet allocation applied to a set of training documents (e.g., messages). Additionally or alternatively, the semantic analysis may include the use of a different topic model (e.g., probabilistic latent semantic analysis). In an additional example, harvesting module 106 may extract the topic from the content of the past message by identifying keywords within the past message that indicate the topic. Additionally or alternatively, extraction module 106 may identify one or more links to additional resources within the past message, and identify the topic of the past message at least in part by identifying a topic and/or categorization of the additional resources.

In some examples, harvesting module 106 may analyze multiple past messages from the sender to identify one or more typical topics of the past messages. In some examples, harvesting module 106 may analyze past messages from the sender to identify traditionally suspect topics (e.g., to determine whether the sender has sent legitimate messages about the traditionally suspect topics), such as pharmaceutical sales, pornography, online gambling, and the like.

In some examples, harvesting module 106 may analyze one or more past messages sent from the sender via the social networking platform to identify a language of the past messages. For example, harvesting module 106 may determine that the sender typically sends messages in Russian, that the sender occasionally sends messages in French, and/or that the sender never sends messages in English. In cases in which the sender has sent past messages to a recipient of the message, harvesting module 106 may determine which language the sender has used to communicate with the recipient.

In some examples, harvesting module 106 may analyze one or more past messages sent from the sender via the social networking platform to identify a writing style of the past messages. The writing style may include any of a variety of characteristics of the past messages. For example, the writing style may include average word counts, average word lengths, grammatical patterns, punctuation usage, capitalization patterns, dialects used, key words used or not used, correct and/or incorrect spelling patterns, French spacing vs. English spacing, etc. In cases in which the sender has sent past messages to a recipient of the message, harvesting module 106 may determine the writing style that the sender has used to communicate with the recipient in the past.

In some examples, harvesting module 106 may analyze one or more past messages sent from the sender via the social networking platform to identify sending times of the past messages. For example, harvesting module 106 may identify a typical time window of sent messages (e.g., 9:00 am to 5:00 pm; 9:00 pm to 2:00 am on Fridays and Saturdays; etc.). In some examples, harvesting module 106 may identify a typical time window of past messages sent by the sender to a recipient of the message.

In some examples, harvesting module 106 may also identify one or more instances of the message and/or portions of the message found outside the social networking platform (e.g., caught by email spam filters outside the social networking platform).

Using FIG. 4 as an example, harvesting module 106 may harvest metadata from social networking server 410. For example, harvesting module 106 may analyze user profile 422 of the sender of message 438. Additionally or alternatively, harvesting module may analyze past messages 432, 434, and 436 sent by the sender of message 438 via the social networking platform. As shown in FIG. 4, system 400 may include a harvesting database 468. In some examples, harvesting module 106 may store the harvested metadata in harvesting database 468 (e.g., for use in determining whether the message is illegitimate and/or for future use in determining the legitimacy of future messages).

Returning to FIG. 3, at step 306 one or more of the systems described herein may determine, based at least in part on the metadata that describes the sender of the message, that the message is illegitimate. For example, at step 306 determination module 108 may, as part of computing device 202 in FIG. 2, determine, based at least in part on metadata 212 that describes sender account 222 used to send message 210, that message 210 is illegitimate.

As mentioned earlier, in some examples one or more of the systems described herein (e.g., harvesting module 106) may identify a set of relationships between users of the social networking platform. For example, harvesting module 106 may identify the contacts, friends, followers, and/or fans of the users to identify how the users relate to each other. In some examples, harvesting module 106 may identify a lack of a connection between the sender of the message and the recipient of the message via the set of relationships. For example, harvesting module 106 may determine that the sender and the recipient are not mutual contacts within the social networking platform, are not friends within the social networking platform, and/or are too distantly connected and/or remotely related within the social networking platform (e.g., removed by three or more degrees of friendship). In these examples, determination module 108 may determine that the message is illegitimate based at least in part on determining that the lack the connection indicates that the message is illegitimate. For example, determination module 108 may determine that the message is illegitimate based at least in part on determining that the sender and the recipient are not friends within the social networking platform and/or friends-of-friends within the social networking platform.

As mentioned earlier, in some examples, one or more of the systems described herein (e.g., harvesting module 106) may identify an amount of past communication between the sender of the message and a recipient of the message via the social networking platform. In these examples, determination module 108 may determine that the amount of past communication falls below a predetermined threshold. For example, determination module 108 may determine that the sender has never sent a message directly to the recipient, and that the message is therefore likely illegitimate. Additionally or alternatively, determination module 108 may determine that the recipient has never accessed (e.g., opened and/or viewed) a message sent by the sender, and that the message is therefore likely illegitimate. In some examples, determination module 108 may determine that the recipient has never replied to a message from the sender and/or initiated a message to the sender and that the message is therefore likely illegitimate. In some examples, determination module 108 may determine that the frequency of communications between the sender and the recipient and/or how recently the sender and recipient have communicated via the social networking platform does not meet a predetermined threshold and that the message is therefore likely illegitimate.

As mentioned earlier, in some examples, one or more of the systems described herein (e.g., harvesting module 106) may identify a locality of the sender of the message defined within a profile of the sender of the message within the social networking platform and a locality of the recipient of the message defined within a profile of the recipient of the message within the social networking platform. In these examples, determination module 108 may determine that the locality of the sender of the message does not match the locality of the recipient of the message. For example, determination module 108 may determine that the message is likely illegitimate based on determining that the sender and the recipient do not share a common city, a common workplace, a common educational institution, a common religious affiliation, a common club, a common check-in location, etc.

As mentioned earlier, in some examples, one or more of the systems described herein (e.g., harvesting module 106) may analyze at least one past message sent from the sender of the message to the recipient of the message via the social networking platform to identify a topic of the past message. In these examples, determination module 108 may determine that the topic of the message does not match the topic of the past message and/or messages. For example, determination module 108 may determine that the sender typically sends messages about politics and stocks and that these topics do not match the topic of the message (e.g., pharmaceutical sales).

As mentioned earlier, in some examples, one or more of the systems described herein (e.g., harvesting module 106) may analyze one or more past messages sent from the sender via the social networking platform to identify a language of the past messages. In these examples, determination module 108 may determine that the language of the past messages does not match the language of the message. For example, determination module 108 may determine that the sender typically communicates in Spanish but that the message is in English. Determination module 108 may therefore determine that the message is likely illegitimate.

As mentioned earlier, in some examples, one or more of the system described herein (e.g., harvesting module 106) may analyze one or more past messages sent from the sender via the social networking platform to identify a writing style of the past messages. In these examples, determination module 108 may determine that the writing style of the message does not match the writing style of the past messages. For example, determination module 108 may determine that the writing style of the past messages indicates typically short messages, including no capitalization, and using non-standard English spellings for certain English words and phrases. Determination module 108 may determine that this writing style does not match the writing style of the message, including a long message, capitalization, and standard spellings for the same English words and phrases. Determination module 108 may therefore determine that the message is likely illegitimate.

As mentioned earlier, in some examples, one or more of the systems described herein (e.g., harvesting module 106) may analyze one or more past messages sent from the sender via the social networking platform to identify sending times of the past messages. In these examples, determination module 108 may determine that the typical times of past messages do not match the time that the message was sent. For example, determination module 108 may determine that the past messages typically were sent in the day time and that the message was sent in the middle of the night.

In some examples, determination module 108 may also identify one or more characteristics of the message as a part of determining that the message is illegitimate. For example, determination module 108 may identify a spam signature within the message. In this example, determination module 108 may determine that a hash of the message and/or a portion of the message matches a hash within a spam database. As another example, determination module 108 may submit the message to a spam categorization model that categorizes the message as spam and/or potential spam. In some examples, determination module 108 may identify a call to action within the message. For example, determination module 108 may a link (e.g., a link to a malicious Internet resource), an email address, a phone number and/or SMS number, as an implicit call to action within the message. In another example, determination module 108 may determine that at least a portion of the message is repeated in a plurality of additional messages via the social networking platform. For example, determination module 108 may determine that the message has been independently sent by unrelated senders (e.g., without one sender having received the message from another sender, thereby indicating the possibility that the message was forwarded within the social networking platform). In this example, determination module 108 may determine that the message is likely illegitimate and represents a hijacking of multiple accounts within the social networking service.

Using FIG. 4 as an example, determination module 108 may determine that message 438 is illegitimate based on 1) stylistic, substantive, and/or linguistic differences between past messages 432, 434, and 436 sent from a user of client 440 (e.g., with user profile 422) to users of clients 460(1)-(n) and message 438 sent to a user of client 450, 2) a lack of social networking connections within the social networking platform between user profiles 422 and 424, and/or 3) a lack of past communications between users of user profiles 422 and 424 on the social networking platform.

Returning to FIG. 3, at step 308 one or more of the systems described herein may perform a remediation action on the message in response to determining that the message is illegitimate. For example, at step 308 remediation module 110 may, as part of computing device 202 in FIG. 2, perform a remediation action on message 210 in response to determining that message 210 is illegitimate.

Remediation module 110 may perform any of a variety of remediation actions. In some examples, remediation module 110 may block the message (e.g., blocking the message from an inbox of the intended recipient, from being posted to a wall and/or as a comment to content, etc.). In some examples, remediation module 110 may forward the message for human analysis (e.g., to verify whether it is actually illegitimate). In some examples, remediation module 110 may warn the recipient and/or a social networking administrator the message may be illegitimate. Additionally or alternatively, remediation module 110 may add the message to a spam database. In some examples, remediation module 110 may use the message to train a spam classifier. For example, remediation module 110 may identify a structure of the message (e.g., identifying personal names, links, application names, stemming words, etc.) and then submit the message structure into a text classification algorithm (e.g., a support vector machine, a naïve bayes classifier, a maximum entropy modeler, etc.). Accordingly, these systems and methods may not only prevent current illegitimate messages, but use identified illegitimate messages to prevent future illegitimate messages.

Using FIG. 4 as an example, remediation module 110 may block message 438 (e.g., from being viewed on client 450), present a warning message to client 450, and/or submit message 438 to a spam database 470.

As explained above, by harvesting social networking data from the social networking platforms relating to senders of messages to determine whether messages are illegitimate, the systems and methods described herein may leverage information about message senders that is stored, generated, maintained, and/or processed by social networking platforms (e.g., information that may otherwise be unavailable to traditional message classification systems) to evaluate the legitimacy of their messages, thereby potentially improving the accuracy of message classification techniques.

Figure 5:
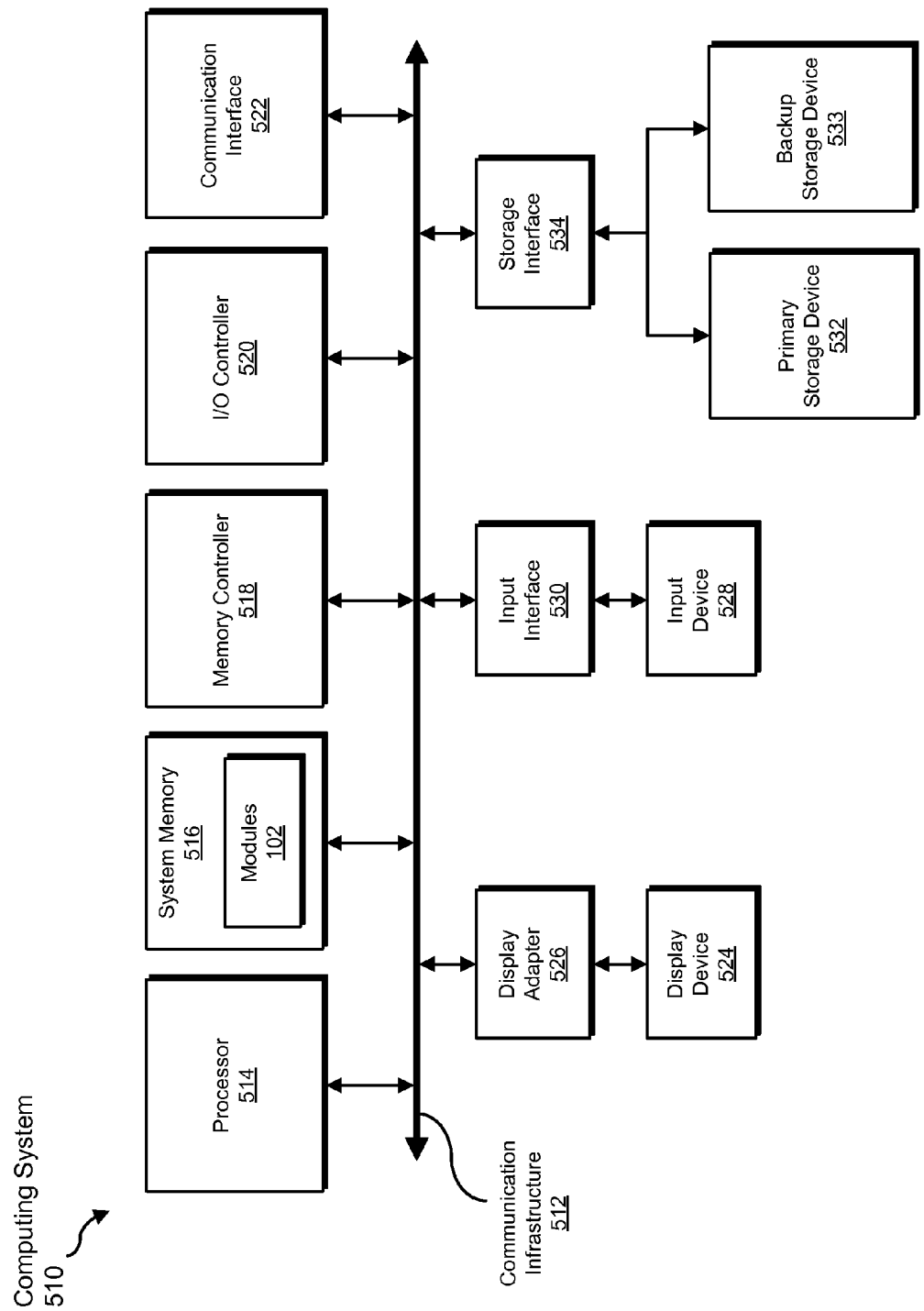
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, harvesting, analyzing, determining, performing, blocking, and adding steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
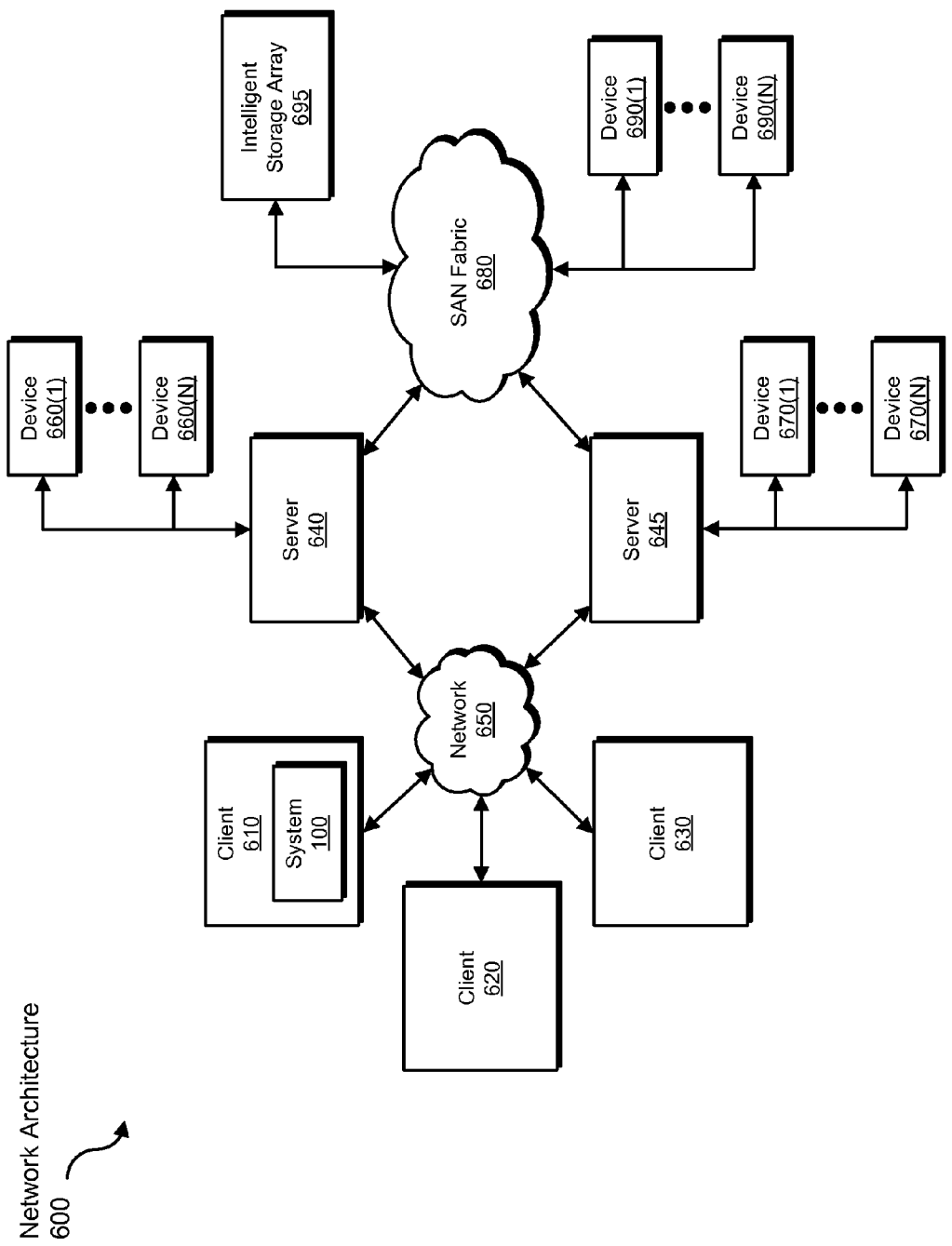
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, harvesting, analyzing, determining, performing, blocking, and adding steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for detecting illegitimate messages on social networking platforms.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing device into a device for detecting illegitimate messages on social networking platforms.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for detecting illegitimate messages on social networking platforms, the method comprising:
    identifying a message submitted via a social networking platform;
    identifying an account, associated with the social networking platform, that submitted the message;
    harvesting, by crawling publicly available data from the social networking platform, metadata from the social networking platform that describes a relationship between the account that submitted the message and a recipient account to which the message is directed;
    determining, based at least in part on the metadata that describes the relationship between the account that submitted the message and the recipient account, that the account that submitted the message and the recipient account are removed by three or more degrees of friendship;
    identifying, based on the metadata that describes the relationship between the account that submitted the message and the recipient account, a topic of at least one past message submitted from the account that submitted the message to the recipient account;
    determining that a topic of the message does not match the topic of the past message;
    determining, based at least in part on determining that the account that submitted the message and the recipient account are removed by three or more degrees of friendship and that the topic of the message does not match the topic of the past message, that the message is illegitimate; and
    performing a remediation action on the message in response to determining that the message is illegitimate;
    wherein each step of the computer-implemented method is performed by a computing device comprising at least one processor.

2. The computer-implemented method of claim 1, wherein:
    harvesting the metadata that describes the relationship between the account that submitted the message and the recipient account further comprises accessing private data, associated with at least one of the account that submitted the message or the recipient account, using an application programming interface associated with the social networking platform; and
    the private data comprises the past message.

3. The computer-implemented method of claim 1, wherein crawling the publicly available data from the social networking platform comprises crawling at least one of public profiles or public messages from the social networking platform.

4. The computer-implemented method of claim 1, wherein the past message was sent via the social networking platform.

5. The computer-implemented method of claim 1, wherein determining that the message is illegitimate is further based on determining that the recipient account has replied to a message from, or initiated a message to, the account that submitted the message less than a predetermined number of times.

6. The computer-implemented method of claim 1, wherein the message comprises a comment relating to content submitted to a social networking service.

7. The computer-implemented method of claim 1, wherein:
    harvesting the metadata that describes the relationship between the account that submitted the message and the recipient account further comprises identifying a language used in the past message; and
    determining that the message is illegitimate is further based on determining that a language of the message does not match the language of the past message.

8. The computer-implemented method of claim 1, wherein:
    harvesting the metadata that describes the relationship between the account that submitted the message and the recipient account comprises identifying a writing style used in the past message; and
    determining that the message is illegitimate is further based on determining that a writing style of the message does not match the writing style of the past message.

9. The computer-implemented method of claim 1, wherein determining that the message is illegitimate is further based on at least one of:
    identifying a spam signature within the message;
    identifying a call to action within the message;

identifying a malicious link within the message; and determining that at least a portion of the message is repeated in a plurality of additional messages submitted via the social networking platform.

10. The computer-implemented method of claim 1, wherein performing the remediation action comprises at least one of:

blocking the message;

forwarding the message for human analysis; and adding the message to a spam database.

11. A system for detecting illegitimate messages on social networking platforms, the system comprising:

an identification module programmed to identify:
a message submitted via a social networking platform; and
an account, associated with the social networking platform, that submitted the message;

a harvesting module programmed to:
harvest, by crawling publicly available data from the social networking platform, metadata from the social networking platform that describes a relationship between the account that submitted the message and a recipient account to which the message is directed;
identify, based on the metadata that describes the relationship between the account that submitted the message and the recipient account, a topic of at least one past message submitted from the account that submitted the message to the recipient account;

a determination module programmed to:
determine, based at least in part on the metadata that describes the relationship between the account that submitted the message and the recipient account, that the account that submitted the message and the recipient account are removed by three or more degrees of friendship;
determine that a topic of the message does not match the topic of the past message;
determine, based at least in part on determining that the account that submitted the message and the recipient account are removed by three or more degrees of friendship and that the topic of the message does not match the topic of the past message, that the message is illegitimate;

a remediation module programmed to perform a remediation action on the message in response to determining that the message is illegitimate; and at least one hardware processor configured to execute the identification module, the harvesting module, the determination module, and the remediation module.

12. The system of claim 11, wherein:
the harvesting module is further programmed to harvest the metadata that describes the relationship between the account that submitted the message and the recipient account by accessing private data, associated with at least one of the account that submitted the message or the recipient account, using an application programming interface associated with the social networking platform; and
the private data comprises the past message.

13. The system of claim 11, wherein the harvesting module is programmed to crawl the publicly available data from the social networking platform by crawling at least one of public profiles or public messages from the social networking platform.

14. The system of claim 11, wherein the message comprises a comment relating to content submitted to a social networking service.

15. The system of claim 11, wherein:
the harvesting module is programmed to harvest the metadata that describes the relationship between the account that submitted the message and the recipient account at least in part by identifying a locality of the account that submitted the message defined within a profile of the account that submitted the message and a locality of the recipient account defined within a profile of the recipient account; and
the determination module is programmed to determine that the message is illegitimate further based on determining that the locality of the account that submitted the message does not match the locality of the recipient account.

16. The system of claim 11, wherein the past message was sent via the social networking platform.

17. The system of claim 11, wherein:
the harvesting module is programmed to harvest the metadata that describes the relationship between the account that submitted the message and the recipient account by identifying a language used in the past message; and
the determination module is programmed to determine that the message is illegitimate further based on determining that a language of the message does not match the language of the past message.

18. The system of claim 11, wherein:
the harvesting module is programmed to harvest the metadata that describes the relationship between the account that submitted the message and the recipient account by identifying a writing style used in the past message; and
the determination module is programmed to determine that the message is illegitimate further based on determining that a writing style of the message does not match the writing style of the past message.

19. The system of claim 11, wherein the determination module is programmed to determine that the message is illegitimate further based on at least one of:

identifying a spam signature within the message;

identifying a call to action within the message;

identifying a malicious link within the message; and determining that at least a portion of the message is repeated in a plurality of additional messages submitted via the social networking platform.

20. A non-transitory computer-readable-storage medium comprising one or more computer-executable instructions that, when executed by at least one processor of a computing device, cause the computing device to:

identify a message submitted via a social networking platform;

identify an account, associated with the social networking platform, that submitted the message;

harvest, by crawling publicly available data from the social networking platform, metadata from the social networking platform that describes a relationship between the account that submitted the message and a recipient account to which the message is directed;

identify, based on the metadata that describes the relationship between the account that submitted the message and the recipient account, a topic of at least one past message submitted from the account that submitted the message to the recipient account;

determine that a topic of the message does not match the topic of the past message;

determine, based at least in part on the metadata that describes the relationship between the account that submitted the message and the recipient account, that the account that submitted the message and the recipient account are removed by three or more degrees of friendship;

determine, based at least in part on determining that the account that submitted the message and the recipient account are removed by three or more degrees of friendship and that the topic of the message does not match the topic of the past message, that the message is illegitimate; and perform a remediation action on the message in response to determining that the message is illegitimate.

* * * * *